United States Patent Office 3,094,300
Patented June 18, 1963

3,094,300
FLIGHT PATH CONTROL SYSTEM
Stephen S. Osder, Phoenix, Ariz., assignor to Sperry Rand Corporation, Great Neck, N.Y., a corporation of Delaware
Filed June 23, 1960, Ser. No. 38,387
14 Claims. (Cl. 244—77)

This invention relates to an improved artificial feel system for controlling the flight path of a dirigible craft such as an aircraft. The servo means of the improved system includes a primary input connection that is operable to move the craft about an axis and a secondary input connection operable to damp the system. In accordance with the invention, the primary channel of the system is effective to provide a short period control that limits the approach of the craft to a stall condition by a combination of outputs, one of which is dependent on the attitude of the craft with respect to an attitude reference and the other of which is dependent on the integrated output of a vertical acceleration sensing means above a predetermined positive value. The damping channel of the improved system is directly controlled by the gated output of the included vertical acceleration sensor.

A primary object of the invention is to provide a multiple input control system of the type described in which the human pilot is unable to maneuver the craft into a stall condition through operation of the stick controller.

One of the features of the improved system resides in the inclusion therein of a gate for blocking the output of the provided vertical acceleration output means therein below a predetermined positive limit and above a predetermined negative limit.

Another feature of the improved control system is provided by the included means for lowering the positive limit of the vertical acceleration gate with approach of the craft to a stall condition. In accordance with the invention, this adjustment is provided by the inclusion in the system of an angle of attack sensor, a gate for blocking the output of the sensor below a predetermined limit, and means operated by the output of the angle of attack gate.

A further feature resides in the utilization in the primary control channel of the system of the integrated output of the gate connected to the vertical acceleration sensor of the system.

Another feature is provided by the inclusion in the damping channel of the system of an output dependent on acceleration of the craft about the axis related to the attitude reference.

Other features and structural details of the invention will be apparent from the following description when read in connection with the accompanying drawings, wherein.

Figure 1:
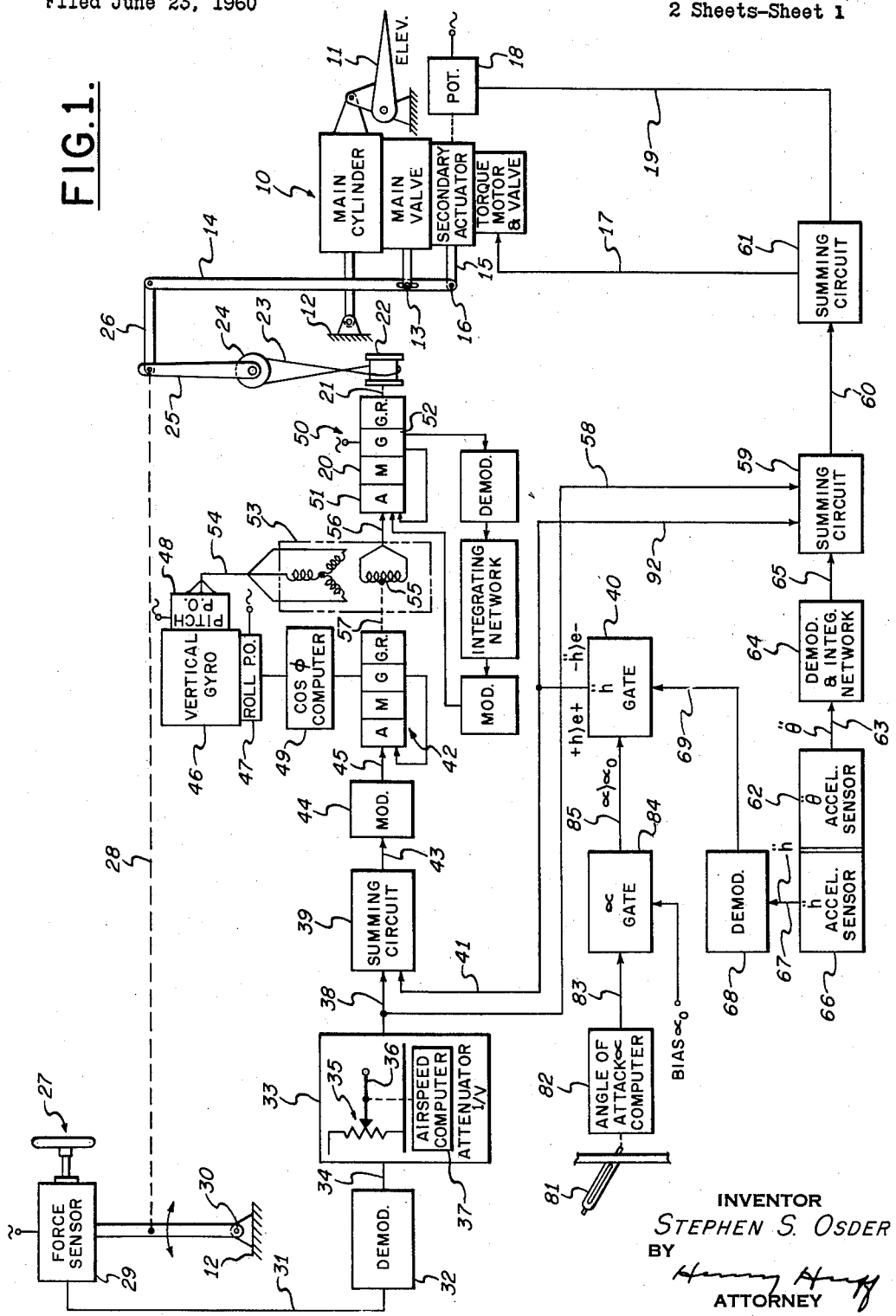
FIG. 1 is a schematic view showing a preferred embodiment of the invention.

With reference to FIG. 1, the improved feel system represented includes servo means or a servomotor as indicated at 10 that is operatively connected to the elevators 11 of an aircraft to move it about its pitch axis. The servo means shown is of the general hydraulic type shown and described in U.S. Patent No. 2,678,177, issued May 11, 1954 to P. J. Chenery et al., for Booster Servo Systems. As in the identified patent, the main cylinder of the servo means 10 is operatively connected to move with a control surface or elevator 11 and the internal fixed piston is pivotally connected at its extended rod end to a relatively fixed frame 12 of the craft. As shown, the main control valve of the servo means is provided by a housing that is fixed to the cylinder housing and a slide stem that is pivotally connected at its end 13 to a multiple input connection or differential control link 14. A secondary or damping input to the servo means 10 shown is provided by a secondary hydraulic actuator of the character of the main servo whose housing is a part of the cylinder and main valve housing and whose piston element extends as a rod 15 that is pivoted to link 14 as indicated at 16. The valve for the secondary actuator is indicated as controlled by an electrically operated torque motor of the character shown in the identified patent whose input is obtained from a lead 17. As shown, a potentiometer 18 provides feedback for the torque motor in accordance with a measure of the displacement between the piston of the secondary actuator from a null condition in relation to the movable common housing of the cylinders of the main servo and secondary actuator. Lead 19 carries the output of the feedback potentiometer.

The primary operating input of the system is transmitted as motion to the link 14 from a booster motive means or electric motor indicated at 20 whose output shaft through suitable reduction gearing drives a shaft 21. The connection between the shaft and link 14 includes a drum 22 driven by the shaft 21, cable 23, a drum 24 driven by drum 22 through the connecting cable 23, an arm 25 extending radially to the axis of drum 24 and a link 26 between the arm 25 and link 14. In the arrangement shown, the means 20 is also connected to position as well as move the pivoted stick and wheel components of a manual control member or controller 27 of the character shown and described in U.S. Patent 2,408,770, issued October 8, 1946, to C. A. Frische et al. As represented, this connection is provided by a general linkage indicated at 28, one end of which is pivoted to arm 25 and the other end of which is pivoted to the stick of the controller 27. The feel of the human pilot to the operation of the system is artificially retained by the direct followback linkage 28 to the stick. The human pilot's influence in the system is exerted during control stick maneuvers by manual effort exerted on the wheel to strain the stick in the direction of its desired motion about an axis 30 with relation to the frame 12 and the output measure of this effort as determined by a force sensor 29 of the character shown in the noted Frische et al. patent. The sensor 29 is a means providing a command output depending on the manual force exerted on the controller by the human pilot either to resist the motion of the stick or to urge it to move when the booster motive means is at rest. In accordance with the invention, the system establishes vertical acceleration limits for the craft within which the command output of the sensor 29 is effective to operate the booster motive means 20 to maneuver the craft about its pitch axis as well as to provide a damping input to the torque motor and valve controlling the operation of the secondary actuator.

As shown in FIG. 1, the elevator channel of the improved system connects the force sensor 29 to the motive means 20 by way of a lead 31 to a suitable demodulator 32 whose output is fed to an attenuator 33 on lead 34. The provided attenuator 33 controls the feel characteristic of the system as a function of air speed so that the force required at controller 27 to produce a given rate of change of the craft's pitch attitude increases with increasing air speed. This feel characteristic results in a constant vertical acceleration for a given applied force for a wide range of air speeds. To prevent the feel characteristic from being "too soft" (excessive pitching rates per given force) at the lower speeds, attenuator 33 is shaped as a non-linear function of air speed so that the signal on lead 34 is only slightly attenuated for speed reductions below about Mach 0.5. The attenuator used for this purpose in FIG. 1 includes a potentiometer 35 whose slider 36 is mechanically connected to an air speed computer 37 so that its output is varied as an inverse function of the speed of the craft. The connecting circuitry shown in FIG. 1 further includes an output lead 38 from attenuator 33 to a suitable electrical summing circuit 39 that also receives the output of a vertical acceleration gate 40 by way of lead 41 as hereinafter described. The integrating means in the elevator channel of the system shown in the drawing is an amplifier, motor and generator unit 42 of the character shown and described in U.S. Patent No. 2,834,562, to G. F. Jude et al. In the provided arrangement, the output of the summing circuit 39 is fed to the amplifier A of unit 42 to drive the motor M and generator G thereof by way of lead 43, modulator 44 and lead 45.

An attitude reference for the pitch axis control channel of the system is provided by a gyroscopic means such as a gyro vertical indicated at 46 with suitable electrical pick-offs 47 and 48 of the selsyn type at the respective roll and pitch axes thereof. To retain the desired artificial feel characteristic in the system during banked maneuvers, the gain in the elevator channel is preferably varied as a function of the roll angle of the craft. This is obtained in the feedback circuit of unit 42 by varying the excitation of the generator G in accordance with the cosine of the angle of bank of the craft from a level condition about its roll or fore and aft axis. The exciting circuit to generator G of unit 42, in FIG. 1, is accordingly made dependent on the output of the vertical gyro 46 as modified by a cosine computer 49 of the bank angle $\phi$ connected to the roll pick-off 47.

The gyro vertical 46 and pick-off 48 of the system constitute means providing an output with tilt of the craft about its pitch axis from a reference attitude. The booster motive means 20 operated by the output of the sensor 29 as well as the pick-off 48 is a component of a second amplifier and generator unit 50 of the type described in the heretofore identified patent to Jude et al. As shown, the respective amplifier and generator components of the unit 50 are indicated at 51 and 52. The unit 50 differs from unit 42 in that a rate feedback to the amplifier 51 is directly obtained from the generator 52 and in that a shaft 21 position feedback is also provided for the amplifier 51 through a second connection to the generator 52 that includes a suitable demodulator, integrating network and modulator. In the arrangement provided, the means for combining the outputs of the force sensor or manual force output means 29 and the pitch reference means 46 includes a data transmission system with a receiver 53 of the Selsyn type, whose stator is electrically connected to the stator of the pick-off 48 by way of leads 54. The wound rotor 55 of the receiver 53 is connected to the input terminal of amplifier 51 through lead 56. The motor of the integrating unit 42 is connected by shafting 57 through suitable reduction gearing to drive the rotor 55 of the receiver 53 and to thereby effectively change the reference established by the vertical gyro 46 for the craft with relation to its attitude about its pitch axis at a rate that is dependent on the force applied at the sensor 29 and its corresponding proportional output. The described operation is effective during control stick steering maneuvers by the human pilot where the craft's vertical acceleration is within predetermined limits and where the output of the receiver 53 results in operation of the booster motive means 20 and corresponding operation of the input connection link 26 to the servo means 10 to control the flight path of the craft. The results of the operation are felt by the human pilot by the simultaneous motion of the stick controller 27 about its axis through means of the arm 25 and the connecting linkage 28. The booster motive means 20 of the improved system provides the primary input to the differential link 14 controlling the operation of the servomotor or servo means 10. Also through linkage 28, the booster motive means operates to move the manually movable member or controller 27 of the system to position it about its axis with relation to the human pilot. In this mode, the operation of the system is damped by movement of the differential link 14 under control of the secondary actuator of the servo means 10 through energization of the indicated torque motor. The magnitude of operation of the damping torque motor is dependent on the output of the force sensor 29 which is fed the torque motor by way of lead 58 connected to lead 38, a summing circuit 59, lead 60, a summing circuit 61 and lead 17. A second input to the summing circuit 59 is provided by a sensor providing an output $\ddot{\theta}$ with acceleration of the craft about its pitch axis as indicated at 62. Such acceleration sensing means may be of the character shown and described in U.S. Patent No. 2,487,793, issued November 15, 1949, to O. E. Esval et al. As shown, the $\ddot{\theta}$ output of the sensor 62 is fed the summing circuit 59 by way of lead 63, demodulator and integrating network 64 and lead 65. The output of the summing circuit 59 is fed to the torque motor by way of lead 60 to the summing circuit 61 where it is combined with the feedback output of potentiometer 18 connected to circuit 61 through lead 19. Lead 17 connects the output of the summing circuit 61 to the torque motor whose valve effects operation of the secondary actuator to move rod 15 and the differential link 14 to damp the system.

Figure 3:
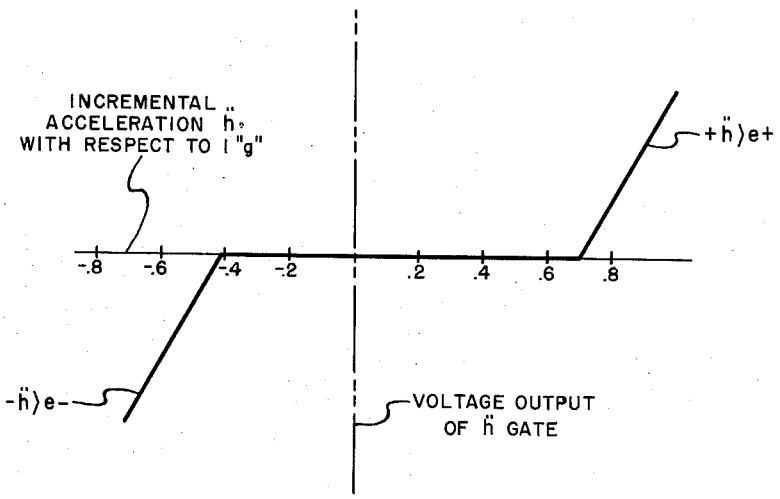
FIG. 3 is a graph showing a voltage curve representative of the output of the $\ddot{h}$ gate of the improved system.

The improved artificial feel system is designed for stable operation within predetermined limits of positive and negative vertical acceleration. Integrated values of such accelerations that exceed the provided limits are utilized in the elevator moving channel to prevent the approach of the craft to a stall condition and restore the system to stable parameters of operation. The improved system accordingly includes means providing an output $\ddot{h}$ with vertical acceleration of the craft in the form of an $\ddot{h}$ acceleration sensor 66 such as shown and described in U.S. Patent No. 2,627,384, issued February 3, 1953, to O. E. Esval. The $\ddot{h}$ gate or vertical acceleration receiver 40 of the system receives the output of the sensor 66 by way of lead 67, demodulator 68 and lead 69. Gate or receiver 40 of the system functions to block the outputs of sensor 66 below a predetermined positive limit $e+$ and above a predetermined negative limit $e-$. The base vertical acceleration of the system as represented in the graph shown in FIG. 3 is termed incremental acceleration $\ddot{h}$ taken with respect to unity gravitational acceleration indicated as one "$g$." According to the illustrative values shown on the graph, positive accelerations exceeding 1.7 "$g$" and negative accelerations below .6 "$g$" are required before the gate 40 provides a vertical acceleration output to the summing circuit 39 by way of lead 41. These respective values are indicated in FIG. 1 in relation to the output lead 41 as $\ddot{h} > e+$ and $-\ddot{h} > e-$.

Figure 2:
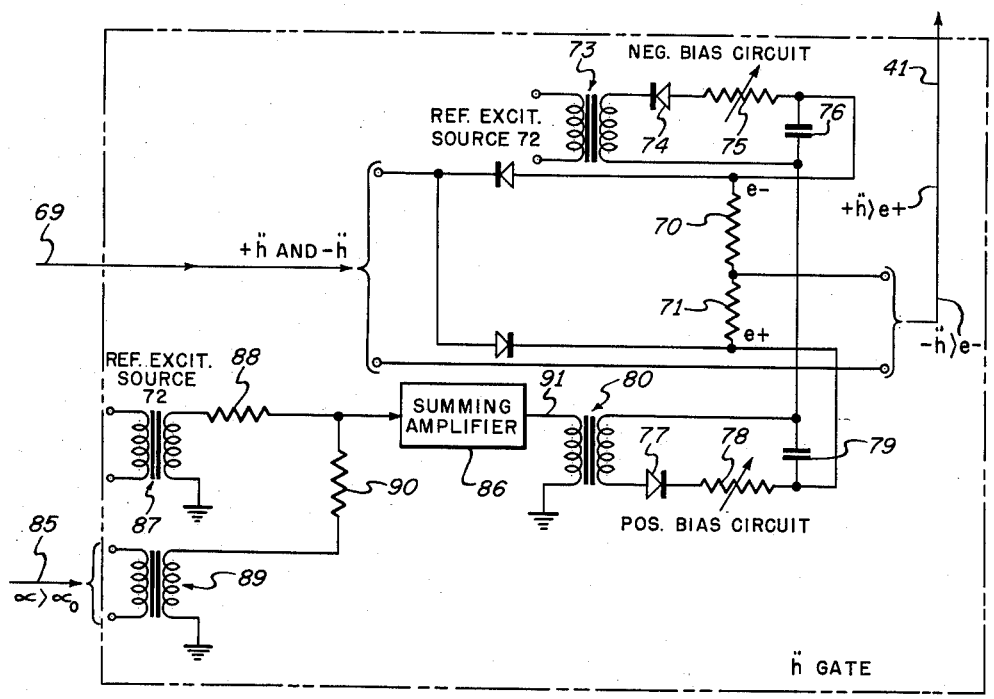
FIG. 2 is a circuit diagram of the $\ddot{h}$ acceleration gate component shown in FIG. 1.

The gate 40 of the system shown in FIG. 2 is an electrical receiver for the demodulated output of the sensor 66. The circuit indicated in FIG. 2 to obtain the "$g$" gating function applies a negative bias voltage $e-$ across a resistor 70 connecting leads 69 and 41 and a positive bias voltage $e+$ across a resistor 71 also connecting the leads 69 and 41 that respectively block negative values of $\ddot{h}$ below the indicated $-.4$ "$g$'s" on the graph and block positive values of $\ddot{h}$ up to $+.7$ "$g$'s" on the graph. The negative bias circuit shown includes a reference excitation source 72, transformer 73, rectifier 74, a variable potentiometer 75 and shunt condenser 76. The bias voltage $e-$ at the resistor 70 of the circuit may be adjusted by varying the resistance of the potentiometer 75 therein. Similar components of the positive bias circuit include rectifier 77, variable potentiometer 78, shunting condenser 79 and an input transformer 80 whose primary winding is connected to the reference excitation source 72. Initial adjustment of the bias voltage $e+$ at the resistor 71 is obtained by the proper setting of the slider of the potentiometer 78.

The improved system provides for effective control of the positive $\ddot{h}$ limit of the gate 40 to lower the limit as a function of the nearness or approach of the craft to a stall condition. To obtain this result, the system includes means for providing an output depending on the angle of attack α of the craft shown in FIG. 1 as a suitable attack angle probe 81 and angle of attack computer 82. As shown, the output α of the computer 82 is fed the $\ddot{h}$ gate 40 by way of lead 83, an α gate 84, and lead 85. Gate 84 functions in a manner similar to the described gate 40 to block the output α of the computer 82 below a predetermined value such as indicated as an input voltage bias $α_0$. Accordingly, until the angle of attack output α exceeds the bias value $α_0$ representing an attack region of impending stall, there is no input to gate 40 from gate 84 by way of lead 85. This condition is indicated by the values $α > α_0$ in relation to the lead 85. A summing amplifier 86 in the circuit between the source 72 and transformer 80 subtracts the angle of attack output α of the gate 84 from the voltage source for the positive bias circuit. Thue e+ in FIG. 2 decreases in value as the craft approaches a stall condition. In the circuits shown, the source 72 is connected to the amplifier 86 by way of transformer 87 and input resistor 88. The gate 84 is connected to the amplifier 86 by lead 89, transformer 89 and input resistor 90. The output of the amplifier 86 is fed the primary of the transformer 80 of the positive bias circuit of the gate 40 by way of lead 91. The system accordingly includes means for adjusting the positive limit of the vertical acceleration gate 40 as well as means responsve to the gated output of the angle of attack computer 82 to operate the adjusting means to lower the positive acceleration gate limit with approach of the craft to a stall condition. Lead 92 connected to lead 41 feeds the output of the $\ddot{h}$ gate 40 to the summing circuit 59 and accordingly the output of the vertical acceleration means beyond the limits provided by the gate 40 is included in the system as a control for the damping torque motor.

The system is designed so that the effect on the stick force gradient as the vertical acceleration limits provided by gate 40 are exceeded is a sudden stiffening of the force required of the human pilot per vertical acceleration unit characteristic. Within the limits provided by the gate 40, the system establishes a substantially linear relation between the stick force applied and the resulting vertical acceleration so that occurrence of the stiffening effect at the stick is immediately felt by the human pilot. This effect is obtained due to the operation of the pitch channel by the integrated output of the gate 40 in a sense that opposes the output of the force sensor 29 and resuls in reversal of the direction of rotation of the motor of the integrating unit 42. The rotor 55 of the receiver 53 of the combining means of the channel is then moved at a rate depending on the integrated output of the $\ddot{h}$ gate 40 to reverse the sense of operation of the elevators and restore the system to its normal condition where the vertical acceleration of the craft is within its predetermined limits. This limited action due to the inclusion of the output of the gate 40 in the system is felt by the human pilot through the resulting change in operation of the booster motive means 20 and its direct effect on the linkage 28. By lowering the positive limit of the acceleration gate 40 as a function of angle of attack, the system operates to prevent the craft from approaching a stall condition. During intervals of operation where there is an output $\ddot{h}$ from the gate 40, it is further directly utilized in the damping channel of the system where it is combined by the summing circuit 59 with the acceleration output $\ddot{θ}$ and the output of the force sensor 29. The system is effective to control the flight path of the craft within predetermined vertical acceleration limits with or without the inclusion therein of the manually operable controller.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. An artificial feel system for controlling the flight path of an aircraft including servo means having a first input connection operable to move the craft about an axis and a second input connection operable to damp the system, a movable manual controller, booster motive means connected to move the controller and the first input connection to the servo means, means providing an output depending on the manual force exerted on the controller, means providing an output with tilt of the craft about the axis from a reference attitude, means providing an output with vertical acceleration of the craft, a gate for blocking the output of the vertical acceleration output means below a predetermined positive limit and above a predetermined negative limit, means for integrating the output of the gate, means providing an output with acceleration of the craft about the axis, means for combining the output of the manual force output means, the output of the integrating means and the output of the reference attitude means to operate the booster motive means, and means for combining the output of the manual force output means, the output of the vertical acceleration means beyond the limits provided by the gate, and the output of the axis acceleration means operatively connected to the second input connection of the servo means.

2. A system as claimed in claim 1 including means providing an output depending on the angle of attack of the craft, a gate for blocking the output of the angle of attack means below a predetermined limit, means for adjusting the positive limit of the acceleration gate, and means responsive to the gated output of said angle of attack means for operating said adjusting means to lower the positive acceleration gate limit with approach of the craft to a stall condition.

3. In a system for controlling the flight path of an aircraft, servo means having an input connection operable to control the attitude of the craft about an axis and a second connection operable to damp the system, motive means connected to move the first input connection to the servo means, means providing an output with tilt of the craft about its axis from a reference attitude, means providing an output with vertical acceleration of the craft, a gate for blocking the output of the vertical acceleration output means below a predetermined positive limit and above a predetermined negative limit, means for integrating the output of the gate, means providing an output with acceleration of the craft about the axis, means for combining the output of the integrating means and the output of the reference attitude means to operate the motive means, and means for combining the output of the vertical acceleration means beyond the limits provided by the gate and the output of the axis acceleration means operatively connected to the second input connection of the servo means.

4. In a system of the class described having a servo means with an input connection operable to move a craft about an axis, a movable manual controller, booster motive means connected to move the controller and the input connection to the servo means, means providing an output depending on the manual force exerted on the controller, means providing an output with tilt of the craft about its axis from a reference attitude, means providing an output with vertical acceleration of the craft, a gate for blocking the output of the vertical acceleration output means below a predetermined positive limit and above a predetermined negative limit, means for integrating the output of the gate, and means for combining the output of the manual force means, the output of the reference attitude means and the output of the integrating means to operate the booster motive means.

5. In a system for controlling the flight path of an aircraft, servo means having a first connection operable to control the craft about an axis and a second connection operable to damp the system, means providing an output with tilt of the craft about its axis from a reference attitude, means providing an output with vertical acceleration of the craft, a receiver for limiting the output of the vertical acceleration means below a positive value and above a negative value, means for integrating the output of the receiver, means controlled by the output of the integrating means and the output of said reference attitude means operatively connected to the first connection of the servo means, and means controlled by the output of the receiver beyond its provided limits operatively connected to the second connection of the servo means.

6. In a system for controlling the flight path of an aircraft, servo means having a first connection operable to control the craft about an axis and a second connection operable to damp the system, a manual controller operatively connected to the first connection of said servo means, means providing an output with vertical acceleration of the craft, a gate for blocking the output of the vertical acceleration output means below a predetermined positive limit and above a predetermined negative limit, means providing an output with acceleration of the craft about the axis, and means for combining the output of the vertical acceleration means beyond the limits provided by the gate and the output of the axis acceleration means operatively connected to the second connection of the servo means.

7. A system as claimed in claim 6, including means providing an output depending on the angle of attack of the craft, a gate for blocking the output of the angle of attack means below a predetermined limit, means for adjusting the positive limit of the acceleration gate, and means responsive to the output of said angle of attack means above the limit provided by the angle of attack gate for operating said adjusting means to lower the positive acceleration gate limit with approach of the craft to a stall condition.

8. In a system for controlling the flight path of an aircraft, servo means having a first connection operable to control the craft about an axis and a second connection operable to damp the system, a movable manual controller operatively connected to the first connection of the servo means, means providing an output depending on the manual force exerted on the controller, means providing an output with vertical acceleration of the craft, a gate for blocking the output of the vertical acceleration output means below a predetermined positive limit and above a predetermined negative limit, means providing an output with acceleration of the craft about the axis, and means combining the output of the force output means, the output of the vertical acceleration means beyond the limits provided by the gate and the output of the axis acceleration means operatively connected to the second connection of the servo means.

9. In a system for controlling an aircraft about an axis, a servomotor having a differential control link with a first input operable to move the craft about its axis and a second input operable to damp the system, a manual control member, an electric motor operatively connected to the control member and to the link to provide the first input to the servomotor, a force sensor at the member providing a command signal depending on the manual force exerted on the member, a vertical reference providing a signal with tilt of the craft about its axis, means providing a signal with acceleration of the craft about its axis, means for combining the signal of the force sensor and the signal of the vertical reference to operate the electric motor, and means connected to said link to provide the second input to said servomotor responsive to the combined signals of the force sensor and the craft axis acceleration signal means.

10. In an artificial feel system for controlling an aircraft about its pitch axis, a servomotor having an input link operable to move the craft about the axis, a manual control member, a force sensor at the member providing an output depending on the manual force exerted on the member, means providing an output with tilt of the craft about its pitch axis from a reference attitude, means providing an output with vertical acceleration of the craft, a gate for blocking the output of the vertical acceleration means below a predetermined positive limit and above a predetermined negative limit, means for integrating the output of the gate, and motive means operatively connected to the member and link responsive to the output of the force sensor, the output of the reference attitude means and the output of the integrating means.

11. A system as claimed in claim 10, including means for adjusting the positive limit of the acceleration gate, an angle of attack sensor providing an output, and means responsive to the output of the angle of attack sensor above a predetermined limit for operating said adjusting means to lower the positive acceleration gate limit.

12. In an artificial feel system for controlling an aircraft about an axis, a servomotor having a differential control link with a first input operable to move the craft about its axis and a second input operable to damp the system, a manual control member, means providing the first input to the link including a force sensor at the member providing a command signal depending on the manual force exerted on the member, an accelerometer providing a signal depending on the angular acceleration of the craft about its axis, and means connected to said link to provide the second input to said servomotor responsive to the combined signals of the force sensor and the accelerometer.

13. In a system of the class described, servo means operable to move a craft about an axis, means providing an output with tilt of the craft about its axis from a reference attitude, means providing an output with vertical acceleration of the craft, a gate for blocking the output of the vertical acceleration output means below an adjustable positive limit, means providing an output depending on the angle of attack of the craft, a gate for blocking the output of the angle of attack means below a determined limit, means for lowering the positive limit of the adjustable acceleration gate, means responsive to the output of the angle of attack means above the limit determined by the angle of attack gate for operating said limit lowering means, means for integrating the adjusted output of the acceleration gate, and means operatively connecting the integrating means and the attitude reference means to the servo means.

14. In a system of the class described having servo means operable to move a craft about an axis, means providing a first input to said servo means depending on tilt of the craft about its axis from a reference attitude, and means for providing a second input to said servo means including an accelerometer providing an output depending on the vertical acceleration of the craft, a gate for blocking the output of the accelerometer below an adjustable positive limit, means for lowering the adjustable positive limit of the acceleration gate, an angle of attack sensing means providing an output, and means dependent on the output of said angle of attack sensing means for operating said limit lowering means.

References Cited in the file of this patent

UNITED STATES PATENTS

| | | |
|---|---|---|
| 2,604,613 | Klass | July 22, 1952 |
| 2,770,429 | Schuck et al. | Nov. 13, 1956 |
| 2,859,926 | Westbury | Nov. 11, 1958 |
| 2,866,933 | Bond et al. | Dec. 30, 1958 |
| 2,949,262 | Newland | Aug. 16, 1960 |
| 3,021,097 | Hecht | Feb. 13, 1962 |
| 3,033,496 | Brands | May 8, 1962 |